United States Patent [19]

Lysen

[11] Patent Number: 5,661,361
[45] Date of Patent: Aug. 26, 1997

[54] BALANCED COMPRESSION ACCELEROMETER

[75] Inventor: Heinrich Lysen, Garching, Germany

[73] Assignee: Pruftechnik Dieter Busch AG, Germany

[21] Appl. No.: 520,388

[22] Filed: Aug. 29, 1995

[51] Int. Cl.⁶ .............................. H01L 41/04; H01L 41/08
[52] U.S. Cl. ........................................ 310/329; 73/514.34
[58] Field of Search ............................ 310/338, 329; 73/35.11, 514.29, 514.35, 654, 514.34

[56] References Cited

U.S. PATENT DOCUMENTS

| | | | |
|---|---|---|---|
| 2,714,672 | 8/1955 | Wright et al. | 310/329 |
| 3,120,622 | 2/1964 | Dranetz et al. | 310/329 |
| 4,104,921 | 8/1978 | Nissl | 310/329 |
| 4,359,658 | 11/1982 | Cartier | 310/329 |
| 4,856,318 | 8/1989 | Hogan et al. | 73/12 |
| 4,980,598 | 12/1990 | Albert | 310/321 |
| 4,982,599 | 1/1991 | Komurasaki | 310/329 |
| 5,109,175 | 4/1992 | Albert | 310/321 |
| 5,193,392 | 3/1993 | Besson et al. | 73/514 AV |
| 5,408,878 | 4/1995 | Lysen | 310/329 |
| 5,412,987 | 5/1995 | Bergstrom et al. | 73/517 R |
| 5,456,110 | 10/1995 | Hulsing, II | 73/514.38 |

FOREIGN PATENT DOCUMENTS

| | | | |
|---|---|---|---|
| 0437397 | 7/1991 | European Pat. Off. | 73/514.34 |
| 1138745 | 2/1985 | U.S.S.R. | 73/514.29 |
| 1401285 | 6/1988 | U.S.S.R. | 73/514.34 |
| 1545171 | 2/1990 | U.S.S.R. | 73/514.34 |

Primary Examiner—Thomas M. Dougherty
Attorney, Agent, or Firm—Kirkpatrick & Lockhart LLP

[57] ABSTRACT

An accelerometer is comprised of a piezo element for producing an electrical signal. A seismic mass is located around the piezo element and has a center of gravity located below said piezo element. A support is provided for supporting the piezo element and the seismic mass. A housing cooperates with the support to enclose both the piezo element and the seismic mass. An electrical conductor is provided to conduct the electrical signal produced by the piezo element to a point outside of the housing.

5 Claims, 2 Drawing Sheets

BALANCED COMPRESSION ACCELEROMETER

BACKGROUND OF THE INVENTION

The present invention is directed to accelerometers. Conventional accelerometer designs locate the entire mass above the piezoelectric element. This creates a large moment of inertia in the direction of tipping, which results in high transverse sensitivity at low bending resonance frequency. Accordingly, it is an objective of the present invention to create an easily mounted, compact, high-frequency accelerometer with low base strain sensitivity and low transverse sensitivity.

SUMMARY OF THE INVENTION

The objective of the present invention is achieved by using a pot-shaped seismic mass which slips over the piezo element, surrounding it in order to reduce the moment of inertia in the direction of tipping. This arrangement calls for the piezo element to be raised a bit from the base; the increase in distance between piezo element and base effects a welcome reduction in base strain sensitivity.

BRIEF DESCRIPTION OF THE DRAWINGS

For the present invention to be clearly understood and readily practiced, the present invention will be described in conjunction with the following figures wherein.

DETAILED DESCRIPTION OF THE PREFERRED EMBODIMENTS

Figure 1:
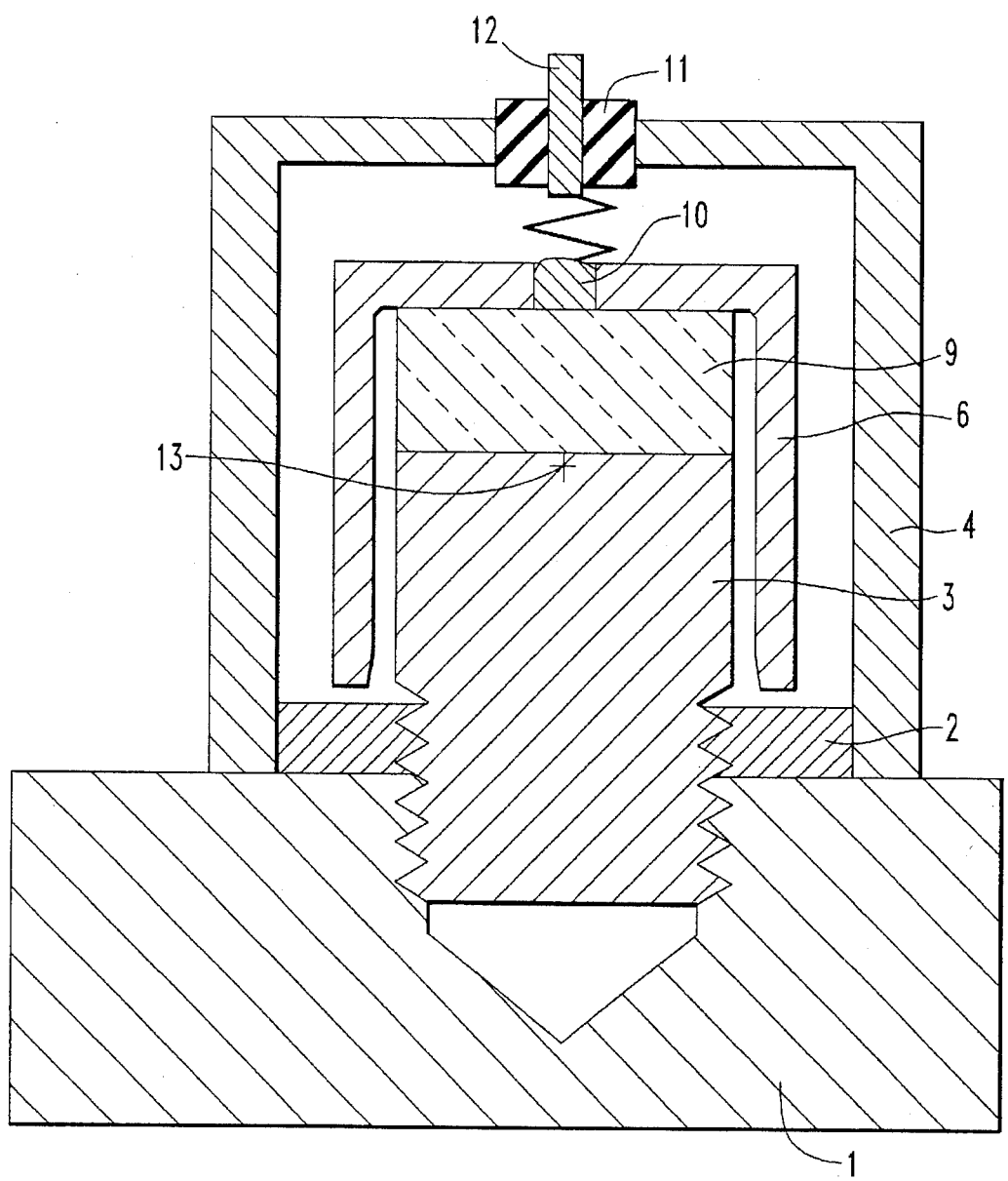
FIG. 1 illustrates an accelerometer constructed according to the teachings of the present invention in contact with a measurement object.

FIG. 1 illustrates an accelerometer constructed according to the teachings of the present invention in contact with a measurement object. Acceleration forces are transmitted from the measurement object 1 to the base 2. The carrier 3 which is fixed to the base 2 conducts the acceleration forces to the piezo element 9. The base 2 and carrier 3 support both the piezo element 9 and a seismic mass 6. The inertia of the seismic mass 6 produces a force within the piezo element that generates an electrical signal available at the contact point 10 and connector 12, which is held in place by insulation 11. The center of gravity 13 of the seismic mass 6 lies below the piezo element. The carrier 3, the seismic mass 6 and the piezo element 9 are bonded together with electrically conductive glue. The housing 4 shields the contents from electrical fields.

Figure 2:
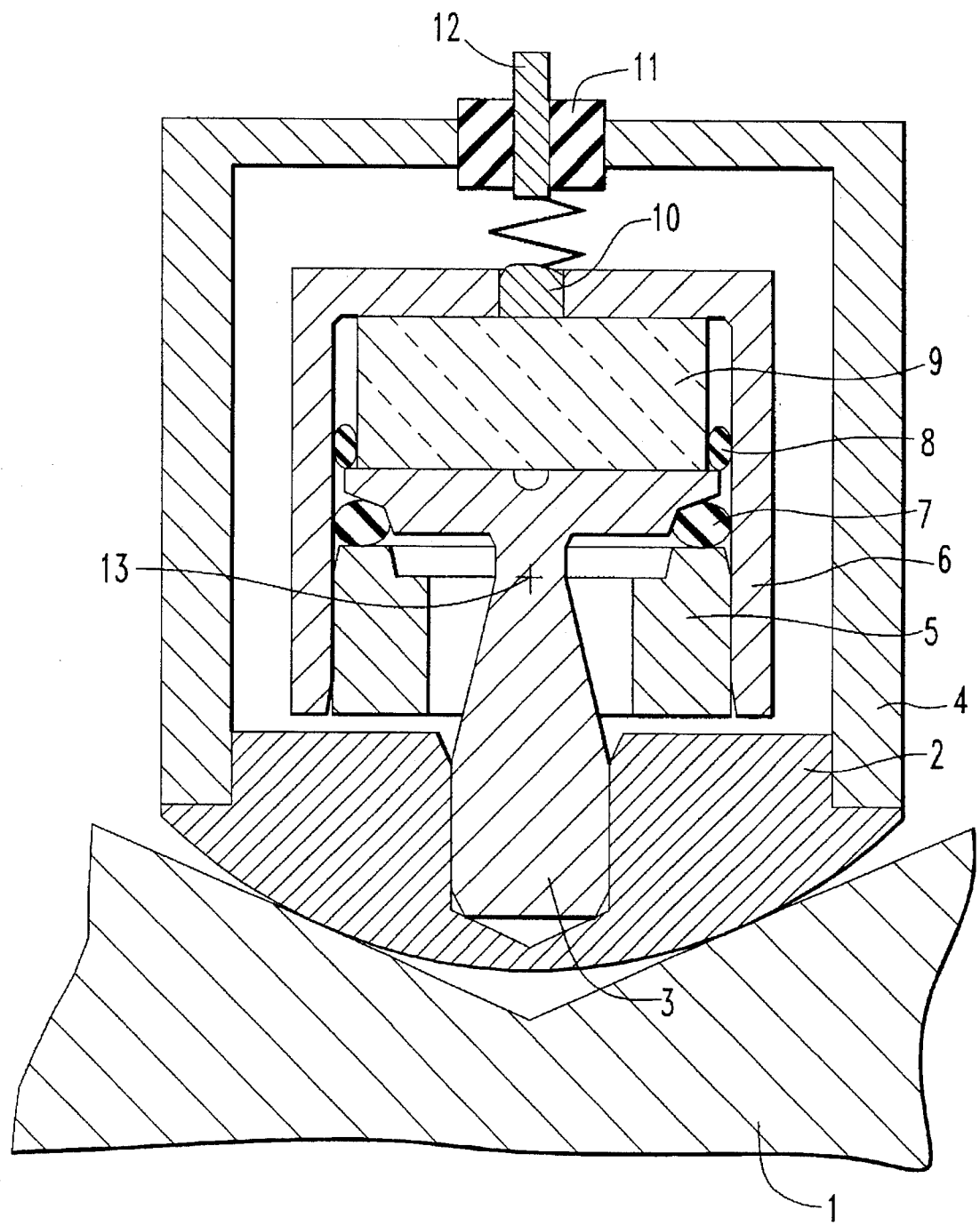
FIG. 2 illustrates another embodiment of an accelerometer constructed according to the teachings of the present invention in contact with a measurement object.

FIG. 2 illustrates another embodiment of an accelerometer constructed according to the teachings of the present invention. Acceleration forces are transmitted from the measurement object 1 to the base 2. The carrier 3, which is fixed to the base 2, conducts the acceleration forces to the piezo element 9. The inertia of the seismic mass portions 5, 6 produces a force within the piezo element that generates an electrical signal at the contact point 10 and connection 12, which is held in place by insulation 11. The center of gravity 13 of the seismic mass 5, 6 lies below the element and near the taper of the carrier, which is necessary to reduce base strain sensitivity. The mass portions 5 and 6 are permanently joined to one another by press fitting. Elastic rubber molded parts 7 and 8 provide the requisite pretensioning as well as electrical insulation and centering guidance during press fitting. The housing 4 shields the contents from electrical fields.

The accelerometer may be connected to the measurement object 1 by means of a threaded connection as shown in FIG. 1 or it may be brought into contact as shown in FIG. 2 when the accelerometer is a hand-held probe. When used as a hand-held probe, the base 2 may have a convex curvature designed to fit into a conical depression in the surface of the measurement object.

While the present invention has been described in conjunction with preferred embodiments thereof, those of ordinary skill in the art will recognize that modifications and variations are possible. The foregoing description in the following claims are intended to cover all such modifications and variations.

What is claimed is:

1. A compression-type accelerometer, comprising:
   a piezo element for producing an electrical signal;
   a seismic mass located around said piezo element, said mass having a center of gravity located below said piezo element;
   support means for supporting said piezo element and said seismic mass;
   housing means connected to said support means for enclosing said piezo element and said seismic mass; and
   means for transmitting said electrical signal to a point outside of said housing.

2. An accelerometer according to claim 1 wherein said seismic mass consists of two portions.

3. An accelerometer according to claim 2 wherein said two portions of said seismic mass are press fit together.

4. An accelerometer according to claim 2 additionally comprising one elastic rubber molded part located between said piezo element and said seismic mass for providing pretension and electrical insulation.

5. A compression-type accelerometer, comprising:
   a piezo element for producing an electrical signal;
   a seismic mass located around said piezo element, said mass having a center of gravity located below said piezo element;
   support means for supporting said piezo element and said seismic mass, said support means is bell-shaped to fit into a conical sink in the measurement object surface in order to raise contact rigidity when said accelerometer is used as a hand-held probe;
   housing means connected to said support means for enclosing said piezo element and said seismic mass; and
   means for transmitting said electrical signal to a point outside of said housing.

* * * * *